(12) United States Patent
Yanai et al.

(10) Patent No.: US 12,257,808 B2
(45) Date of Patent: Mar. 25, 2025

(54) TUBE AND PUMP USING SAME

(71) Applicant: JUNKOSHA INC., Ibaraki (JP)

(72) Inventors: Kouichi Yanai, Ibaraki (JP); Yukihiko Hayashi, Ibaraki (JP)

(73) Assignee: JUNKOSHA INC., Ibaraki (JP)

( * ) Notice: Subject to any disclaimer, the term of this patent is extended or adjusted under 35 U.S.C. 154(b) by 432 days.

(21) Appl. No.: 17/794,114

(22) PCT Filed: Jan. 21, 2021

(86) PCT No.: PCT/JP2021/002116
§ 371 (c)(1),
(2) Date: Jul. 20, 2022

(87) PCT Pub. No.: WO2021/149783
PCT Pub. Date: Jul. 29, 2021

(65) Prior Publication Data
US 2023/0047117 A1    Feb. 16, 2023

(30) Foreign Application Priority Data

Jan. 21, 2020    (JP) .................... 2020-007861

(51) Int. Cl.
*B32B 1/08*    (2006.01)
*B32B 5/18*    (2006.01)
(Continued)

(52) U.S. Cl.
CPC .................. *B32B 1/08* (2013.01); *B32B 5/18* (2013.01); *B32B 5/32* (2013.01); *B32B 7/022* (2019.01);
(Continued)

(58) Field of Classification Search
CPC ...... F04B 43/0072; F04B 43/08; F04B 45/06; F04B 45/08; B32B 1/08; B32B 5/18;
(Continued)

(56) References Cited

U.S. PATENT DOCUMENTS 3,875,970 A * 4/1975 Fitter .................. F04B 43/0072
417/477.9
5,482,447 A * 1/1996 Sunden ............... F04B 43/0072
138/119
(Continued)

FOREIGN PATENT DOCUMENTS

CN    1208125 A    2/1999
CN    101583484 A    11/2009
(Continued)

OTHER PUBLICATIONS

Dec. 8, 2023, Chinese Office Action issued for related CN application No. 202180010356.1.
(Continued)

*Primary Examiner* — Kenneth J Hansen
*Assistant Examiner* — Chirag Jariwala
(74) *Attorney, Agent, or Firm* — Paratus Law Group, PLLC (57) ABSTRACT

A tube is for use in a pump that transports a fluid by peristaltic movement and includes: a flow path that serves as a transport path of the fluid and extends in a first direction; and a body portion formed around the flow path, the body portion includes a first layer formed on the flow path and a second layer formed on the first layer, a flexural modulus of elasticity in a radial direction of the second layer is smaller than a flexural modulus of elasticity in a radial direction of the first layer, and the elastic modulus ratio R2 of the second layer is larger than the elastic modulus ratio R1 of the first layer.

14 Claims, 4 Drawing Sheets

(51) Int. Cl.
  *B32B 5/32*  (2006.01)
  *B32B 7/022*  (2019.01)
  *F04B 43/00*  (2006.01)
  *F04B 43/08*  (2006.01)
  *F04B 45/06*  (2006.01)
  *F04B 45/08*  (2006.01)
  *F16L 11/04*  (2006.01)

(52) U.S. Cl.
  CPC .......... *F04B 43/0072* (2013.01); *F04B 43/08* (2013.01); *F04B 45/06* (2013.01); *F04B 45/08* (2013.01); *F16L 11/04* (2013.01); *B32B 2260/02* (2013.01); *B32B 2260/046* (2013.01); *B32B 2266/104* (2016.11); *B32B 2307/54* (2013.01); *B32B 2307/546* (2013.01); *B32B 2597/00* (2013.01)

(58) Field of Classification Search
  CPC .. B32B 5/26; B32B 5/32; B32B 7/022; B32B 2260/02; B32B 2260/021; B32B 2260/046; B32B 2260/048; B32B 2262/0238; B32B 2262/0284; B32B 2266/104; B32B 2305/026; B32B 2307/54; B32B 2307/546; B32B 2597/00; A61M 39/08
  USPC .............. 138/118, 137, 140, 177; 428/315.5, 428/319.3, 319.7
  See application file for complete search history.

(56) References Cited

U.S. PATENT DOCUMENTS

| | | | |
|---|---|---|---|
| 6,016,848 A | 1/2000 | Egres, Jr. | |
| 6,168,397 B1 | 1/2001 | Iwata | |
| 6,977,105 B1 * | 12/2005 | Fujieda | F16L 11/06 138/140 |
| 2002/0031628 A1 | 3/2002 | Zumbrum et al. | |
| 2003/0012905 A1 | 1/2003 | Zumbrum et al. | |
| 2008/0248226 A1 | 10/2008 | Simon et al. | |
| 2009/0169790 A1 | 7/2009 | Nadeau et al. | |
| 2010/0009107 A1 | 1/2010 | Defilippi et al. | |
| 2012/0216903 A1 * | 8/2012 | Osborne | F16L 39/02 156/158 |
| 2014/0037880 A1 * | 2/2014 | Siddhamalli | B32B 1/08 264/174.1 |
| 2015/0252918 A1 | 9/2015 | Garver et al. | |
| 2016/0178091 A1 | 6/2016 | Nadeau et al. | |
| 2017/0261132 A1 | 9/2017 | Garver et al. | |
| 2020/0139687 A1 * | 5/2020 | Zhang | B32B 9/043 |
| 2021/0146669 A1 * | 5/2021 | McCauley | B32B 27/12 |
| 2023/0047117 A1 | 2/2023 | Yanai et al. | |

FOREIGN PATENT DOCUMENTS

| | | |
|---|---|---|
| CN | 101646871 A | 2/2010 |
| CN | 107000294 A | 8/2017 |
| JP | H06-036832 U | 5/1994 |
| JP | 2002-502735 A | 1/2002 |
| JP | 2002-516625 A | 6/2002 |
| JP | 2009-041607 A | 2/2009 |
| JP | 4327352 B2 | 9/2009 |
| JP | 2011-506142 A | 3/2011 |
| JP | 2017-512947 A | 5/2017 |
| JP | 2018-015751 A | 2/2018 |
| WO | WO 2010/050366 A1 | 5/2010 |
| WO | WO 2016/100696 A1 | 6/2016 |
| WO | WO 2017/094807 A1 | 6/2017 |
| WO | WO 2021/149782 A1 | 7/2021 |

OTHER PUBLICATIONS

Apr. 27, 2021, International Search Report issued for related PCT Application No. PCT/JP2021/002116.
Apr. 27, 2021, International Search Opinion issued for related PCT Application No. PCT/JP2021/002116.
Aug. 11, 2023, European Seach Report issued for related EP Application No. 21744147.6.
Apr. 12, 2023, Japanese Office Action issued for related JP Application No. 2021-572804.

* cited by examiner

TUBE AND PUMP USING SAME

CROSS REFERENCE TO PRIOR APPLICATION

This application is a National Stage Patent Application of PCT International Patent Application No. PCT/JP2021/002116 (filed on Jan. 21, 2021) under 35 U.S.C. § 371, which claims priority to Japanese Patent Application No. 2020-007861 (filed on Jan. 21, 2020), which are all hereby incorporated by reference in their entirety.

TECHNICAL FIELD

The present invention relates to a tube and a pump used for fluid transport. In particular, the present invention relates to a tube useful for controlling flow of a fluid in the tube by deformation of the tube, such as a tube used in a peristaltic device such as a peristaltic pump, and a pump including such a tube.

BACKGROUND ART

In recent years, there is a demand for tubes that have more excellent durability not only in chemical industrial plants and semiconductor manufacturing devices but also in pharmaceutical and food-and-drink factories. Most of tubes in related art are used in a stationary state. However, in order to reduce a manufacturing space and increase productivity within a unit site, a manufacturing device moves complicatedly, and as a result, there are increasing cases where the tubes are deformed in various manners and used. In such cases, the tubes are required to have mechanical resistance against repeated stress caused by bending, sliding, or twisting.

In addition, as another aspect, a peristaltic device such as a peristaltic pump can be exemplified. After a tube is deformed by being pressed in a radial direction by a roller in the peristaltic device, a deformation position is moved by movement of the roller, and thus a fluid (for example, a liquid) is transferred. Such a peristaltic pump can simplify a flow path structure as compared with other pumps, and is less likely to contaminate the fluid. For this reason, the peristaltic pump is often used in the field of food, medical equipment, and the like, and in recent years, the peristaltic pump is also used for sending a photoresist when a semiconductor is manufactured.

In related art, as a tube used in this type of peristaltic pump, a tube described in Prior Technical Document 1 (WO2017/094807) is known. The tube includes an inner layer formed of a porous fluorine resin impregnated with a fluorine-based elastomer, an intermediate layer formed of a fluorine-based elastomer laminated on the inner layer, and an outer layer laminated on the intermediate layer.

In addition, as a tube used in the peristaltic pump, a tube described in Prior Technical Document 2 (Japanese Patent No. 4327352) is also known. Such a tube is formed by impregnating sheet-shaped stretch-expanded polytetrafluoroethylene with one or two types of liquid silicone by using one or two continuous gravure rolls and rolling the impregnated polytetrafluoroethylene.

SUMMARY OF INVENTION

Problem to be Solved by the Invention

Although the tube as described above exhibits extremely high durability as compared with a tube having a general configuration even in a use environment accompanied by a large external force and a large shape change, there is room for improvement in achieving a longer usage time.

Means for Solving the Problem

In order to solve the above problem, tubes and the like having the following configuration are provided.

A first tube is a tube for use in a pump that transports a fluid by peristaltic movement, the tube including: a flow path that serves as a transport path of the fluid and extends in a first direction; and a body portion formed around the flow path, wherein the body portion includes a first layer formed on the flow path and a second layer formed on the first layer, a flexural modulus of elasticity in a radial direction of the second layer is smaller than a flexural modulus of elasticity in a radial direction of the first layer, and when an elastic modulus ratio R1 of the first layer is defined as a ratio of a tensile modulus of elasticity in a circumferential direction of the first layer to the flexural modulus of elasticity in the radial direction of the first layer, and an elastic modulus ratio R2 of the second layer is defined as a ratio of a tensile modulus of elasticity in a circumferential direction of the second layer to the flexural modulus of elasticity in the radial direction of the second layer, the elastic modulus ratio R2 of the second layer is larger than the elastic modulus ratio R1 of the first layer.

A second tube is a tube for use in a pump that transports a fluid by peristaltic movement, the tube including: a flow path that serves as a transport path of the fluid and extends in a first direction; and a body portion formed around the flow path, wherein the body portion includes a first layer formed on the flow path and a second layer formed on the first layer, a flexural modulus of elasticity in a radial direction of the second layer is smaller than a flexural modulus of elasticity in a radial direction of the first layer, and a tensile modulus of elasticity in a circumferential direction of the second layer is larger than the flexural modulus of elasticity in the radial direction of the second layer and/or a tensile modulus of elasticity in the radial direction of the second layer.

A third tube is a tube for use in a pump that transports a fluid by peristaltic movement, the tube comprising: a flow path that serves as a transport path of the fluid and extends in a first direction; and a body portion formed around the flow path, wherein the body portion includes: a first layer that is formed on the flow path and includes a first porous base material having a plurality of micropores and a first resin entering the plurality of micropores of the first porous base material; and a second layer that is formed on the first layer and includes a second porous base material having a plurality of micropores and a second resin entering the plurality of micropores of the second porous base material, a flexural modulus of elasticity in a radial direction of the second layer is smaller than a flexural modulus of elasticity in a radial direction of the first layer, and the second porous base material extends in a circumferential direction of the tube in a cross section perpendicular to the first direction.

EMBODIMENTS FOR CARRYING OUT THE INVENTION

Hereinafter, embodiments of a tube according to the present invention will be described. It should be noted that the embodiments described below do not limit the invention according to the claims, and all combinations of features described in the embodiments are not necessarily essential to the solution of the invention. In addition, the respective embodiments in respective examples may be freely combined within a range in which technical significance of the present invention is not lost.

A first embodiment will be described with reference to (a) and (b) of FIG. 1. (a) of FIG. 1 shows a tube cross-sectional structure in a plane perpendicular to a longitudinal direction of a tube 20 of the first embodiment, and (b) of FIG. 1 shows a tube cross-sectional structure in a plane parallel to the longitudinal direction of the tube 20 at a position indicated by X-X' in (a) of FIG. 1.

Figure 1:
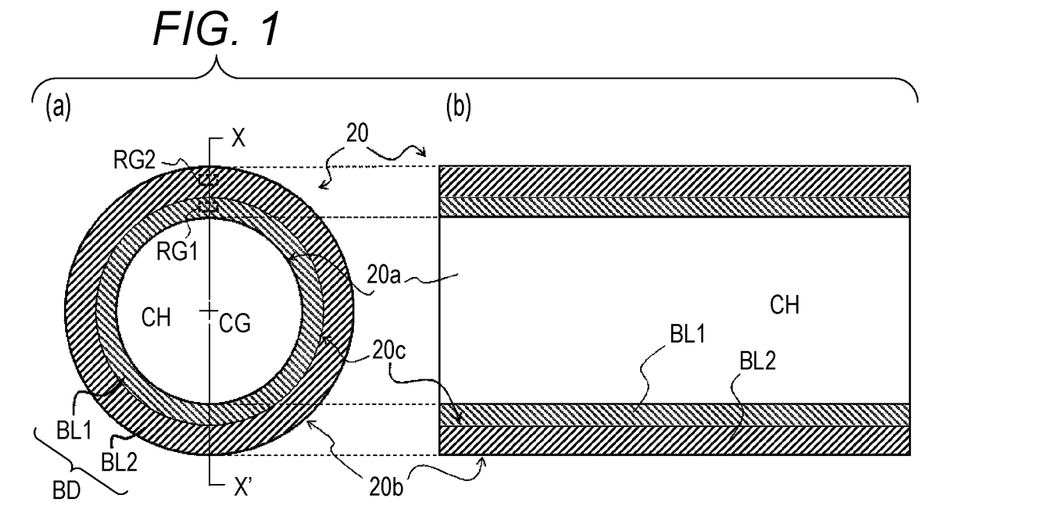
FIG. 1 shows a structure of a tube of a first embodiment.

As shown in (a) of FIG. 1, the tube 20 includes a flow path CH therein, and a body portion BD of the tube 20 is formed so as to surround the flow path CH. The body portion BD includes an inner circumferential surface 20a that defines the flow path CH, and an outer circumferential surface 20b that is a surface opposite to the inner circumferential surface.

As shown in (b) of FIG. 1, the flow path CH is formed continuously along the longitudinal direction of the tube 20 (a left-right direction on paper in (b) of FIG. 1), and serves as a fluid transport path that allows a fluid taken in from one end of the tube 20 to move to the other end.

The body portion BD includes a first layer BL1 and a second layer BL2 formed on an outer circumference of the first layer BL1. In the present embodiment, the first layer BL1 includes the inner circumferential surface 20a, and is in contact with the fluid to be transported on this surface. The second layer BL2 is formed on a surface 20c located on an outer side of the first layer BL1 (a side opposite to the inner circumferential surface 20a) so as to surround the first layer BL1. The first layer BL1 and the second layer BL2 are laminated in a radial direction of the tube, and are firmly bonded to each other via the boundary surface 20c.

Here, directions in the present specification will be described with reference to (a) of FIG. 1. The radial direction is a direction represented as a virtual straight line (not shown) passing through a center CG of the flow path CH in a plane perpendicular to a direction in which the flow path CH extends (first direction). When a cross-sectional shape of the flow path is not circular, a position of a center of gravity of the cross-sectional shape of the flow path may be regarded as the center CG. A size in the radial direction is a distance between two points on the virtual straight line. For example, a thickness of a certain layer in the tube is defined as a distance between two intersections at which each of one interface and the other interface of the layer intersects with the above-described virtual straight line. Bending in the radial direction is one form of a change in a tube shape in a cross section perpendicular to the first direction. For example, deformation in which a curvature of each layer of the tube shown in (a) of FIG. 1 or a distance from any point on each layer to the center CG partially changes (typically, deformation in which a circular tube cross section is crushed into an elliptical shape) includes bending in the radial direction of the first layer BL1 or the second layer BL2.

On the other hand, for example, a direction along the inner circumferential surface 20a or a direction in which each layer extends is represented as a circumferential direction.

A flexural modulus of elasticity in the radial direction of the second layer BL2 of the tube 20 of the present embodiment is configured to be smaller than a flexural modulus of elasticity in the radial direction of the first layer BL1. A tube applied to a peristaltic pump is crushed by an external force until an internal space thereof is completely closed. Flexibility (shape restorability) that prevents breakage even under such large deformation, a shape restoring force that allows quick restoration to an original shape when the external force is removed, and durability that prevents breakage even if an operation of reciprocating between the crushed shape and the original shape is repeated for a long period of time are required. In general, these characteristics include those that are in a trade-off relationship, and for example, a flexible material easily secures durability, while a sufficient shape restoring force may not be obtained.

In this regard, for example, in Prior Technical Document 1, a laminated tube, in which an outer layer that is flexible and rich in shape restorability is formed on an inner layer that is low in shape restorability when used alone, is used to exhibit a desired function.

However, the inventors of the present application have found that more excellent characteristics can be exhibited in a tube having a structure in which a layer formed of a material having a relatively small elastic modulus is provided in an outer circumferential region when the tube includes the following configuration.

Thus, the tube of the present embodiment further includes the following features (1) and/or (2).

(1) A ratio R2 of a tensile modulus of elasticity in the circumferential direction to the flexural modulus of elasticity in the radial direction of the second layer BL2 is larger than a ratio R1 of a tensile modulus of elasticity in the circumferential direction to the flexural modulus of elasticity in the radial direction of the first layer BL1.

(2) The tensile modulus of elasticity in the circumferential direction of the second layer BL2 is larger than the flexural modulus of elasticity in the radial direction of the second layer BL2. Alternatively, the tensile modulus of elasticity in the circumferential direction of the second layer BL2 is larger than a tensile modulus of elasticity in the radial direction of the second layer BL2.

Since the second layer that has the flexural modulus of elasticity smaller than that of the first layer has such characteristic anisotropy of elastic modulus, the tube of the present embodiment achieves high durability. Even in a case of being used for a long time under a condition of extremely large mechanical stress such as in a peristaltic pump, occurrence of a failure, deterioration of fluid transport characteristics, and a failure is prevented.

Figure 2:
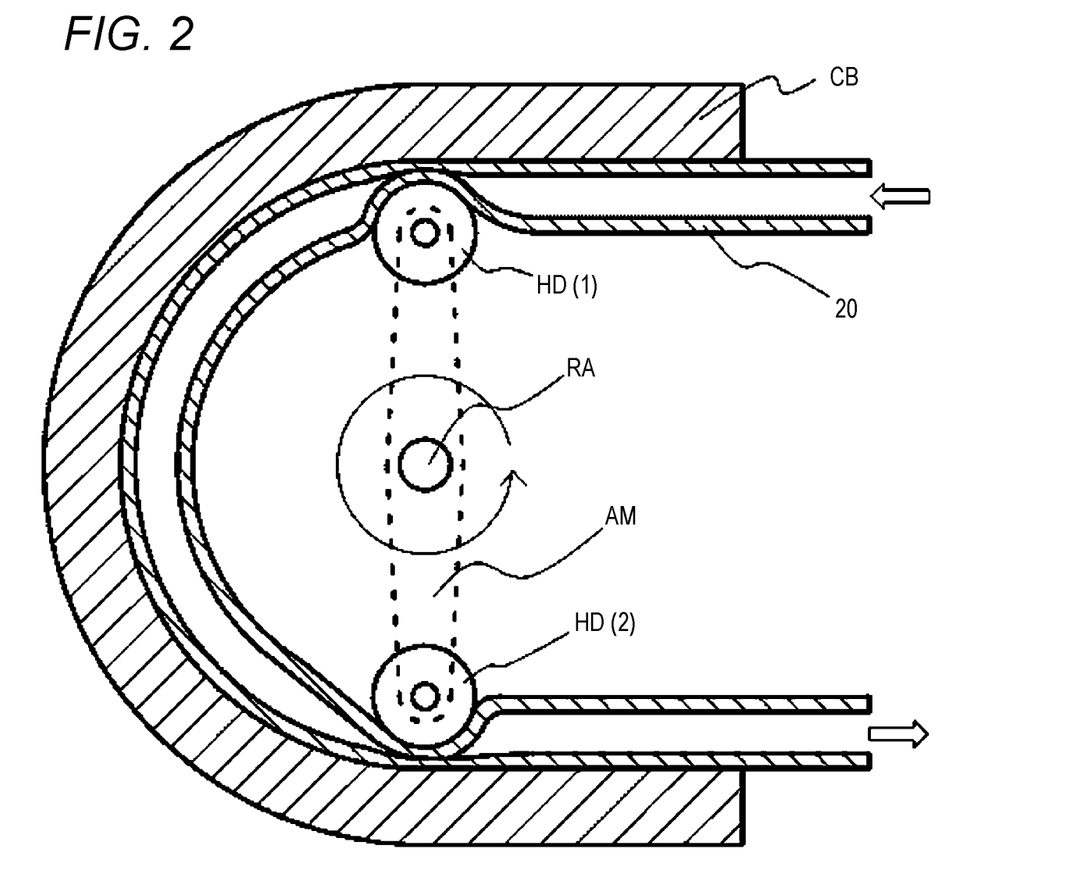
FIG. 2 shows a peristaltic pump including the tube of the first embodiment.

Operations and operational effects of the peristaltic pump of the tube 20 of the present embodiment will be described with reference to FIGS. 2 and 3. FIG. 2 shows an outline of a mechanism portion of the peristaltic pump to which the tube of the present embodiment is applied. The peristaltic pump includes a case portion CB. The tube 20 of the present embodiment is disposed along an inner surface of the case CB. The peristaltic pump includes a rotation portion that is rotated by driving a rotation shaft RA. The rotation portion further includes a support portion AM connected to the rotation shaft RA and one or more head portions HD formed at an end portion of the support portion AM. The head portion HD is moved along the inner surface of the case portion CB by rotation of the rotation portion in a direction of an arrow indicated by a solid line in FIG. 2. From the viewpoint of reducing damage to a tube surface, the head portion HD is preferably configured as a rotatable roller. A size of a gap between the head portion HD and the inner surface of the case portion CB is set to be smaller than twice a thickness of a body portion of the tube 20. The tube is interposed and crushed between the head portion HD and the case portion CB at a position where the head portion is abutted against the tube. As a result, a closed region in which an area of a flow path is substantially zero is formed at the same position.

The head portion HD is moved by the rotation operation of the rotation portion, and the closed region is also moved accordingly, so that a fluid in the tube is transported. In the example shown in FIG. 2, the rotation portion rotates counterclockwise on paper, and accordingly, the fluid is transported in a direction indicated by a hollow arrow. Although not shown, one end of the tube is connected to a supply source of the liquid to be transported (for example, a liquid storage tank or a pipe connected thereto), and the other end is connected to a supply destination of the liquid to be transported (for example, a treatment tank or a pipe connected thereto).

Figure 3:
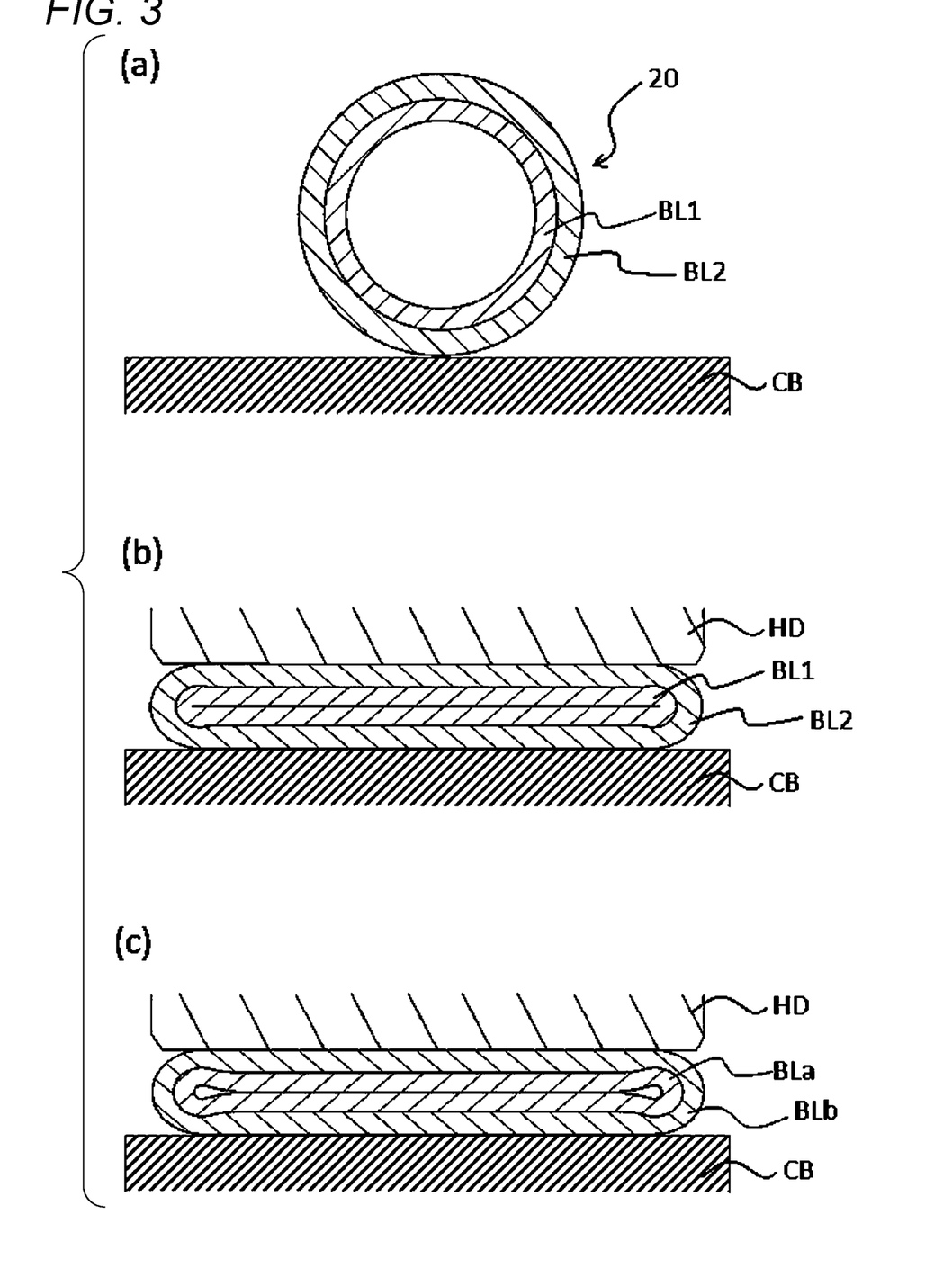
FIG. 3 shows a shape change in a cross-sectional view of the tube in the peristaltic pump shown in FIG. 2.

(a) and (b) of FIG. 3 show changes in a cross-sectional shape of the tube 20 at a certain position in the peristaltic pump. As shown in (a) of FIG. 3, before the head HD reaches the position, that is, when no pressure is applied to the tube 20 by the head HD, the tube 20 has a substantially circular cross-sectional shape and has a large internal space therein. Thereafter, when the head HD reaches the position, the tube 20 is interposed and crushed between the case CB and the head HD, and thus the closed region is formed at the position. When the head HD moves further and moves away from the position, the tube 20 returns to the shape shown in (a) of FIG. 3 again due to a shape restoring force of the tube 20.

In the present embodiment, the tube 20 has a multilayer structure, and the second layer BL2, which is more flexible than the first layer, that is, has a smaller flexural modulus of elasticity in the radial direction than the first layer, is disposed on an outer circumferential side of the first layer BL1 located on an inner side. As described above, since the partial region on the outer circumferential side of the tube is made of the flexible material, improved durability can be obtained.

While development is being advanced, the inventors of the present application have found that a new problem may occur when the outer layer is simply replaced with a material having a small elastic modulus. (c) of FIG. 3 shows the cross-sectional shape of the tube in a state in which the problem found by the inventors has occurred. (c) of FIG. 3 shows a state in which the internal space of the tube is not closed and a gap is formed even though the gap between the head portion HD and the case portion CB is reduced to a predetermined value. In the state in which the gap remains as described above, it is difficult to appropriately perform the fluid transport, and for example, a necessary transport amount cannot be secured. Although it is possible to create the closed state again by reducing the size of the gap between the head HD and the case portion CB and increasing the pressure applied to the tube, with this method, an amount of deformation of the tube during use becomes large, and a pressure higher than the original state is applied to regions other than an end portion where the gap is generated, which may deteriorate durability again.

One of reasons why such a gap is likely to be formed is that, when the outer layer is replaced with the material having the small elastic modulus, the outer layer is likely to be bent and is likely to be elongated at the same time. As shown in (c) of FIG. 3, at both end portions of the crushed shape, bending R becomes small, so that a layer BLb on the outer circumferential side of the tube is largely extended, and thus a layer thickness of this region decreases. As a result, a pressure applied from the head portion HD and the case portion CB is less likely to be transmitted to a layer BLa located on an inner side, and insufficient closing is likely to occur.

In this regard, the tube of the present embodiment has one or more of the following configurations (1) and (2).

(1) The ratio R2 of the tensile modulus of elasticity in the circumferential direction to the flexural modulus of elasticity in the radial direction of the second layer BL2 is larger than the ratio R1 of the tensile modulus of elasticity in the circumferential direction to the flexural modulus of elasticity in the radial direction of the first layer BL1.

(2) The tensile modulus of elasticity in the circumferential direction of the second layer BL2 is larger than the flexural modulus of elasticity in the radial direction of the second layer BL2. Alternatively, the tensile modulus of elasticity in the circumferential direction of the second layer BL2 is larger than the tensile modulus of elasticity in the radial direction of the second layer BL2.

Thus, the tensile modulus of elasticity in the circumferential direction of the second layer is secured while the flexural modulus of elasticity of the second layer is reduced. Since the second layer of the tube 20 has such anisotropy of the elastic modulus, local elongation in an end region is prevented, and thus the occurrence of insufficient closing can be prevented.

The second layer having such anisotropy of the elastic modulus can be obtained, for example, by controlling orientation of a constituent member the second layer. Alternatively, the second layer may be configured as a composite of two or more types of materials having different elastic moduli, and the anisotropy may be imparted by controlling arrangement of the respective materials.

In order to obtain a large effect, for example, in the configuration (1), the ratio R2 is preferably 1.1 times or more, and more preferably 1.2 times or more than the ratio R1. In the configuration (2), the elastic modulus in the circumferential direction of the second layer BL2 is preferably 1.1 times or more, and more preferably 1.2 times or more than a tensile modulus of elasticity or a compression modulus of elasticity in a thickness direction. In order to achieve such remarkable anisotropy of the elastic modulus, a method of forming the second layer as a composite of two or more types of materials having different elastic moduli can be the most effective and simplest method.

Figure 4:
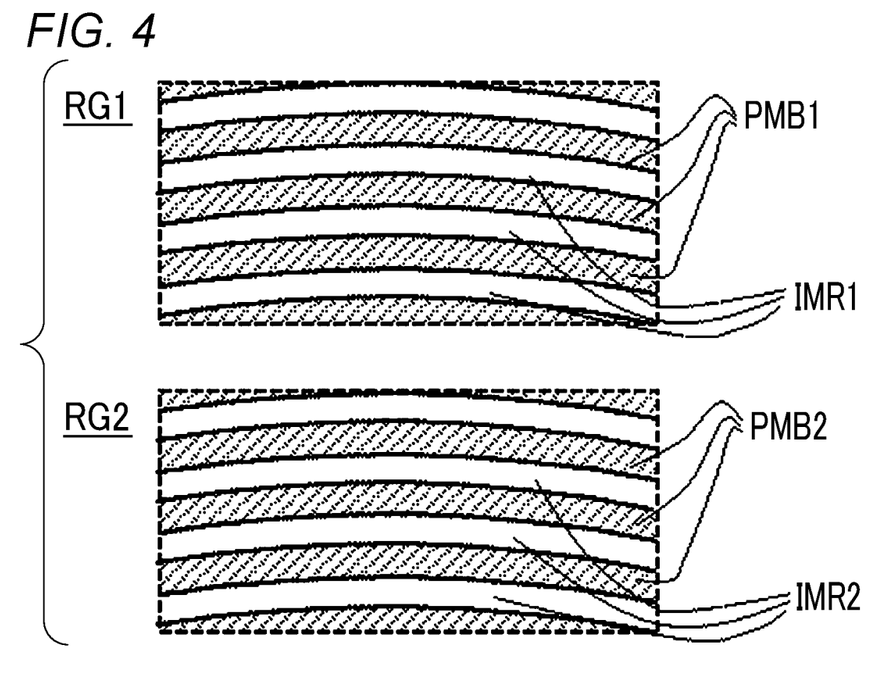
FIG. 4 is an enlarged view of a region RG1 and a region RG2 shown in FIG. 1.

An example of a more detailed structure of the tube of the first embodiment will be described with reference to FIG. 4. A first region RG1 is a partial region in the first layer BL1. Here, a region indicated by a rectangular broken line in the first layer BL1 in (a) of FIG. 1 is shown. In the present embodiment, the first region RG1 includes first base material layers PMB1. The first base material layers PMB1 are fixed to each other via first resin layers IMR1. The first base material layers PMB1 and the first resin layers IMR1 extend in the circumferential direction of the tube 20. In the present embodiment, the first region RG1 is configured as a laminate in which a plurality of base material layers and a plurality of resin layers are alternately laminated. The first base material layer is preferably constituted by a base material formed of a material having a larger elastic modulus than the first resin layer. A large pressure may be applied by the fluid to be transported to the tube body applied to the pump from the flow path toward the outer circumference. When a tube diameter is expanded by this pressure, quantitativeness of a transport amount may be deteriorated or a service life may be shortened. Since the first layer includes the base material extending in the circumferential direction therein, the expansion of the tube diameter can be prevented even when there is a large internal pressure.

A second region RG2 is a partial region in the second layer BL2. Here, a region indicated by a rectangular broken line in the second layer BL2 in (a) of FIG. 1 is shown. In the present embodiment, the second region RG2 includes second base material layers PMB2. The second base material layers PMB2 are fixed to each other via second resin layers IMR2. The second base material layers PMB2 and the second resin layers IMR2 extend in the circumferential direction of the tube 20. In the present embodiment, the second region RG2 is configured as a laminate in which a plurality of base material layers and a plurality of resin layers are alternately laminated. Flexural moduli in the radial direction of the second region RG2 and the second layer BL2 are smaller than flexural moduli in the radial direction of the first region RG1 and the first layer BL1, respectively. Such a feature can be achieved by selecting a constituent material of the second base material layer PMB2 and/or the second resin layer IMR2 or adjusting structures. The second base material layer includes a base material formed of a material having a larger elastic modulus than the second resin layer. In this way, by having the configuration in which the layers having different elastic moduli extend in the circumferential direction, the second layer that has larger tensile elasticity in the circumferential direction than elasticity in other directions is formed.

In the present embodiment, a porous base material having a large number of micropores can be applied as the base material constituting the first base material layer. It is preferable that a first resin enters these micropores. Similarly, a porous base material having a large number of micropores can be applied as the base material constituting the second base material layer. It is preferable that a second resin enters these micropores. In such a configuration, not only an area of a bonding interface between the porous base material and the resin layer can be increased, but also a structure in which the porous base material and the resin layer are complicatedly entangled with each other can be obtained, so that a large interlayer bonding strength can be obtained. Further, by setting density of the micropores to $5 \times 10^4$ pores/mm$^2$ or more, it is possible to prevent stress concentration on a specific region even in a state in which a large internal stress is generated due to deformation.

Figure 5:
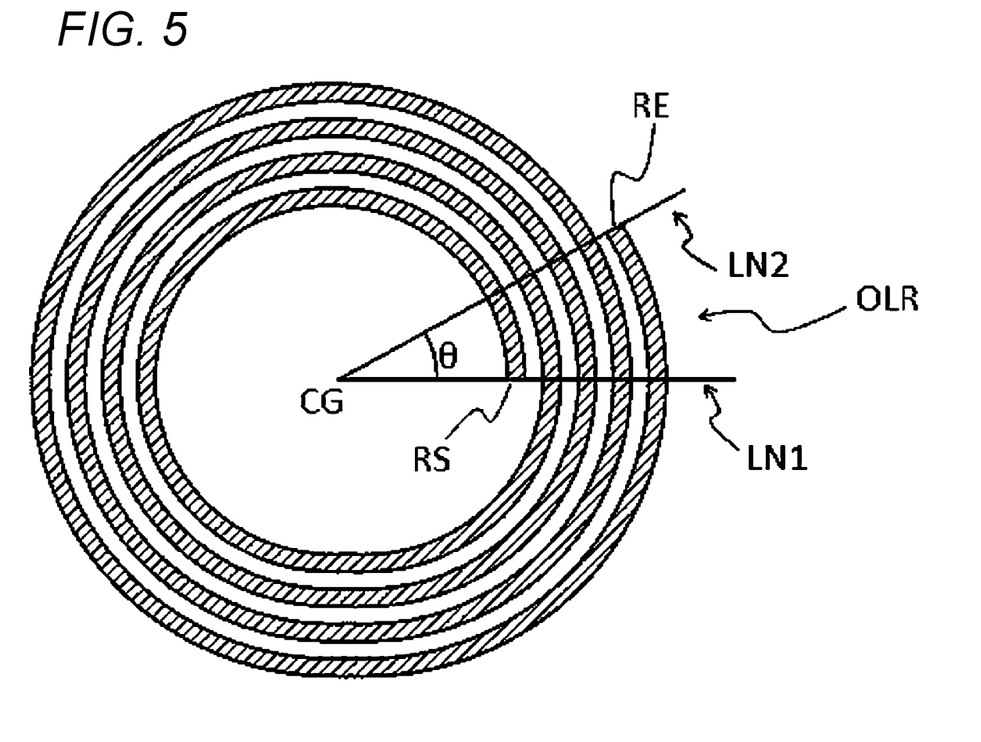
FIG. 5 is a schematic view showing an example of a configuration of a base material of the tube of the first embodiment.

FIG. 5 schematically shows an example of a formation state of the base material constituting the first base material layer PMB1 in the first layer BL1 in a cross section perpendicular to the first direction. In FIG. 5, the first resin IMR1 and the second layer BL2 are not shown.

The base material constituting the first base material layer PMB1 of the tube has a spiral shape in a cross-sectional view as shown in FIG. 5. Such a configuration can be easily obtained by winding one base material a plurality of times. The base material has a starting point RS and an ending point RE at both ends thereof. In a case where the base material is wound from a side closer to the flow path CH, the starting point RS corresponds to winding start of a winding process of the base material, and the ending point RE corresponds to winding end. In the cross-sectional view, the base material is formed so as to wind around the center CG while gradually increasing a radius from the starting point RS to the ending point RE, and is formed as an integrated unit without any break from the starting point RS to the ending point RE.

In such a configuration, an overlapping region OLR is generated. The overlapping region is a region in which the number of base material layers is larger than that of the other region. For example, the first layer shown in FIG. 5 includes an overlapping region constituted by five base material layers and the other region constituted by four base material layers.

Here, a virtual straight line passing through the center CG of the flow path of the tube and the starting point RS is defined as a straight line LN1, and a virtual straight line passing through the center CG of the flow path of the tube and the ending point RE is defined as a straight line LN2. Further, among angles formed by the straight line LN1 and the straight line LN2, a magnitude of an angle θ at a position facing the overlapping region OLR is defined as an included angle θ (degrees). Since the number of windings and the like are not considered, the included angle θ is defined in a range of 0 degrees or more and less than 360 degrees. The included angle θ may be defined as a magnitude of a central angle of a sector formed by the overlapping region and the center CG of the flow path.

The included angle θ of the first base material layer is preferably 270 degrees or less. When the included angle is large, that is, when a proportion of the overlapping region is large, the other region that has a smaller number of layers and a relatively smaller strength than the overlapping region is locally formed. This narrow region where the strength is small may become a path for linear growth of cracks generated due to fatigue inside the tube. By setting the included angle θ to 270 degrees or less, the occurrence of such a region can be prevented.

The included angle θ of the first base material layer is more preferably 60 degrees or less. When both the overlapping region and the other region have a certain size, distorted deformation is likely to occur due to a difference in behavior between the high strength region and the low strength region in a process of deformation of the tube caused by peristaltic movement, which leads to a disadvantageous effect on the durability of the tube. By setting the included angle θ to 60 degrees or less, uniform mechanical characteristics in the circumferential direction are obtained.

The included angle θ of the first base material layer is particularly preferably 30 degrees or less. With such a configuration, since the overlapping region where the strength is relatively high and the starting point RS and the ending point RE which are disadvantageous for securing the strength are disposed close to each other, the mechanical characteristics which are even more uniform in the circumferential direction are obtained.

In addition, the included angle θ of the first base material layer is preferably 5 degrees or more. In the configuration in which the one base material is wound a plurality of times, it is necessary to consider control of a change in the included angle θ at the time of manufacturing. In particular, in the case of a multilayer structure in which the number of base material layers exceeds 10, the included angle θ may change by 15 degrees or more before and after cure shrinkage of the first layer. Although it is also conceivable to secure a large overlapping region before cure shrinkage based on an assumed shrinkage amount, since a cure shrinkage amount includes variation at each position in the longitudinal direction in the tube, for example, even if the included angle θ is 3 degrees at a certain position, the included angle θ becomes −2 degrees at another position, that is, the included angle θ becomes 358 degrees, and thus the above-described included angle θ may exceed 270 degrees. By setting the included angle θ to 5 degrees or more, even when the variation occurs, it is possible to prevent occurrence of such a problem.

In particular, in a tube to which a base material having porosity of more than 50% to be described later is applied, an effect of preventing shrinkage by supporting of the base material is reduced, and therefore, setting the included angle θ of the first base material layer to 5 degrees or more effectively contributes to improvement of durability.

As described above, the improvement of the durability by the included angle θ of the base material has been described based on the first layer and the first base material layer, and the same operational effect can also be obtained in the second layer.

Thus, similarly to the first base material layer shown in FIG. 5, the base material constituting the second base material layer PMB2 of the tube has a spiral shape in a cross-sectional view, and includes the starting point RS and the ending point RE of the second base material layer at both ends thereof. The base material is formed as an integrated unit without any break from the starting point RS to the ending point RE. The second layer includes the overlapping region OLR of the second base material layer in which the number of base materials is larger than that of the other region.

A virtual straight line passing through the center CG of the flow path of the tube and the starting point RS of the second base material layer is defined as the straight line LN1 of the second base material layer, a virtual straight line passing through the center CG of the flow path of the tube and the ending point RE of the second base material layer is defined as the straight line LN2 of the second base material layer. Further, a magnitude of the angle θ at a position facing the overlapping region OLR of the second base material layer among angles formed by the straight line LN1 and the straight line LN2 of the second base material layer is defined as the included angle θ (degrees) of the second base material layer. Alternatively, the included angle θ of the second base material layer may be defined as a magnitude of a central angle of a sector formed by the overlapping region of the second base material layer and the center CG of the flow path.

The included angle θ of the second base material layer is preferably 270 degrees or less, more preferably 60 degrees or less, and particularly preferably 30 degrees or less. In addition, the included angle θ of the second base material layer is preferably 5 degrees or more. By configuring the second layer and the second base material layer in this way, a tube with improved durability can be obtained.

It is preferable that the overlapping region of the first base material layer and the overlapping region of the second base material layer are disposed at positions that do not overlap each other in the circumferential direction. In addition, in consideration of the fact that a starting point of a crack caused by a fatigue fracture is on the inner circumferential surface of the tube, it is preferable that an average value of the included angle θ of the first base material layer is smaller than an average value of the included angle θ of the second base material layer in six or more randomly extracted cross sections at different positions in the longitudinal direction of the tube. For the same reason, a standard deviation of the included angle θ of the first base material layer is preferably smaller than a standard deviation of the included angle θ of the second base material layer.

Although a case where the number of layers is two has been described as the first embodiment, the present invention is not limited thereto. For example, a chemically stable third layer may be formed at a position in contact with the flow path, or a bonding layer may be provided between the first layer and the second layer. Alternatively, a surface protective layer may be further formed on an outer side of the second layer. However, since the starting point RS and the ending point RE cause starting points of cracks and stress distribution, the total number thereof is preferably 8 or less, and particularly preferably 4 or less in all the base materials observed in the cross section of the tube. Thus, regardless of the number of layers included in the tube or the number of laminated base materials constituting the layers, the tube is preferably constituted by four or less base materials in total, and particularly preferably constituted by two or less base materials in total.

A size in the radial direction of a region formed of the second base material layer and the second resin layer may be larger than a size in the radial direction of a region formed of the first base material layer and the first resin layer. Even when a layer having high flexibility and a small elastic modulus is formed to be thick, an increase in internal stress during deformation can be relatively prevented.

An average inter-base-material distance in the region formed of the second base material layer and the second resin layer may be larger than an average inter-base-material distance in the region formed of the first base material layer and the first resin layer. Here, an inter-base-material distance is a distance in the radial direction between thickness centers of the respective base materials between the base materials adjacent to each other in an up-down direction at the time of lamination. The average inter-base-material distance is an average value of inter-base-material distances in a laminate including four or more base material layers. When the tube has such a configuration, it is conceivable that clear anisotropy is easily imparted to the region formed of the second base material layer and the second resin layer disposed on the outer circumferential surface side of the tube.

(Base Material)

The base material constituting the first base material layer and/or the second base material layer is made of, for example, a resin, and has high flexibility. A plurality of micropores are preferably formed on a surface and/or from the surface to the inside. When the resin constituting the resin layer formed between the base material layers enters the micropores, it is possible to secure bonding strength that withstands large internal stress at the time of severe deformation such as exposure of the tube applied to the peristaltic pump. An average diameter of the micropores in a plan view is preferably 1 mm or less, and more preferably 1 μm (micrometer) or less. The micropores may be formed at least on the surface of the base material, and preferably have a configuration in which the micropores communicate with each other in a depth direction.

Examples of such a base material include a woven fabric and a nonwoven fabric formed of fibers of a polymer material. A porous structure may also be formed by foaming and stretching a base material formed in a sheet shape. The formation of the micropores by foaming or stretching is preferable since an extremely small diameter and a high porosity can be easily obtained.

The constituting resin is not limited to a specific resin, and is preferably a fluorine resin, as specific examples, polytetrafluoroethylene (PTFE), tetrafluoroethylene-hexafluoropropylene copolymer resin (FEP), tetrafluoroethylene-perfluoroalkyl-vinyl-ether copolymer resin (PFA), tetrafluoroethylene-hexafluoropropylene-perfluoroalkyl-vinyl-ether copolymer resin (EPE), ethylene-tetrafluoroethylene copolymer resin (ETFE), ethylene-tetrafluoroethylene-hexafluoropropylene copolymer resin (THV), chlorotrifluoroethylene resin (PCTFE), ethylene-chlorotrifluoroethylene copolymer resin (ECTFE), vinylidene fluoride resin (PVdF) and vinyl fluoride resin (PVF) are selected.

In addition, from the viewpoint of mechanical properties and chemical resistance, polyester resins represented by polyethylene terephthalate (PET) and polyethylene naphthalate (PEN), polyarylate resins represented by polyether ether ketone (PEEK), high molecular weight polyethylene or polyaramid, and, further, polyimide resins are also preferable embodiments.

(Resin)

A resin material constituting the first resin layer and/or the second resin layer formed between the base material layers is preferably a thermosetting resin from the viewpoint of mechanical properties and chemical stability. The thermosetting resin referred to in the present invention is a natural or synthetic resin exhibiting rubber elasticity, and is also referred to as rubber or elastomer. The thermosetting resin exhibits rubber elasticity as a result of a crosslinking reaction caused by heat treatment, electron beam treatment, or the like. Alternatively, a thermoplastic elastomer exhibiting such rubber elasticity by forming a block copolymer having both a crystalline portion and an amorphous portion may also be used in the present invention.

Examples of such a thermosetting resin include diene rubber such as natural rubber, styrene-butadiene rubber (SBR), isoprene rubber (IR), butadiene rubber (BR), chloroprene rubber (CR), and acrylonitrile-butadiene rubber (NBR), butyl rubber (isobutylene-isoprene rubber (IIR)), ethylene-propylene rubber (EPM), ethylene-propylene-diene rubber (EPDM), urethane resin, silicone rubber, fluorine rubber (FKM), and perfluorinated rubber (FFKM). From the viewpoint of chemical resistance, chloroprene rubber (CR), acrylonitrile-butadiene rubber (NBR), ethylene-propylene-diene rubber (EPDM), urethane resin, silicone rubber, fluorine rubber (FKM), and perfluorinated rubber (FFKM) are preferable. In addition, from the viewpoint of workability when manufacturing the tube, it is preferable that the resin material is liquid near room temperature and urethane resin, silicone rubber, silicone rubber containing a fluorine element (fluorinated silicone rubber, polyfluoroether rubber), and fluorine rubber (FKM) are particularly preferable embodiments.

Examples of the thermoplastic elastomer include an olefin-based elastomer, a styrene-based elastomer, a polyester-based elastomer, a polyamide-based elastomer, and a polyurethane-based elastomer. Since these resins melt and liquefy at a high temperature, the sheet-shaped base material described above can be impregnated at that time.

Although a crosslinking system of the thermosetting resin is not particularly limited, a case where molecules having a relatively large molecular weight are generated by a crosslinking reaction and released from the resin should be avoided since pores will remain in the tube and volume shrinkage will increase. Preferred embodiments include an addition reaction to a double bond using a radical generator, an addition reaction to a double bond by a hydrosilylation reaction, and an addition reaction between an isocyanate and a hydroxyl group or an amino group. In addition, it is also possible to add a crosslinking aid or a catalyst for promoting the crosslinking reaction.

In the present invention, the sheet-shaped base material described above is used as a role of improving the mechanical properties of the tube, and the mechanical properties can also be improved by adding a filler to the thermosetting resin. Specific examples thereof include granular materials such as natural silica, synthetic silica, carbon black, white carbon, magnesium carbonate, spherical glass beads, natural or synthetic mica, and talc. About 0.1 to 30% by weight of such fillers can be added to the resin depending on purposes. In addition, it is also possible to add various colorants, pigments, dyes, and various stabilizers. Specific examples thereof include an oxidation stabilizer, a UV absorber, a flame retardant, an antimicrobial agent, an antioxidant, an ozone deterioration inhibitor, a scorch inhibitor, a rubber softener, a bubble inhibitor, an antistatic agent, a lubricant, and a tackifier. An addition amount of the filler may be different between the first layer and the second layer. By setting an amount of the filler added to the first layer located closer to the flow path than the second layer to be smaller than an amount of the filler added to the second layer, contamination of the transported fluid can be prevented.

Figure 6:
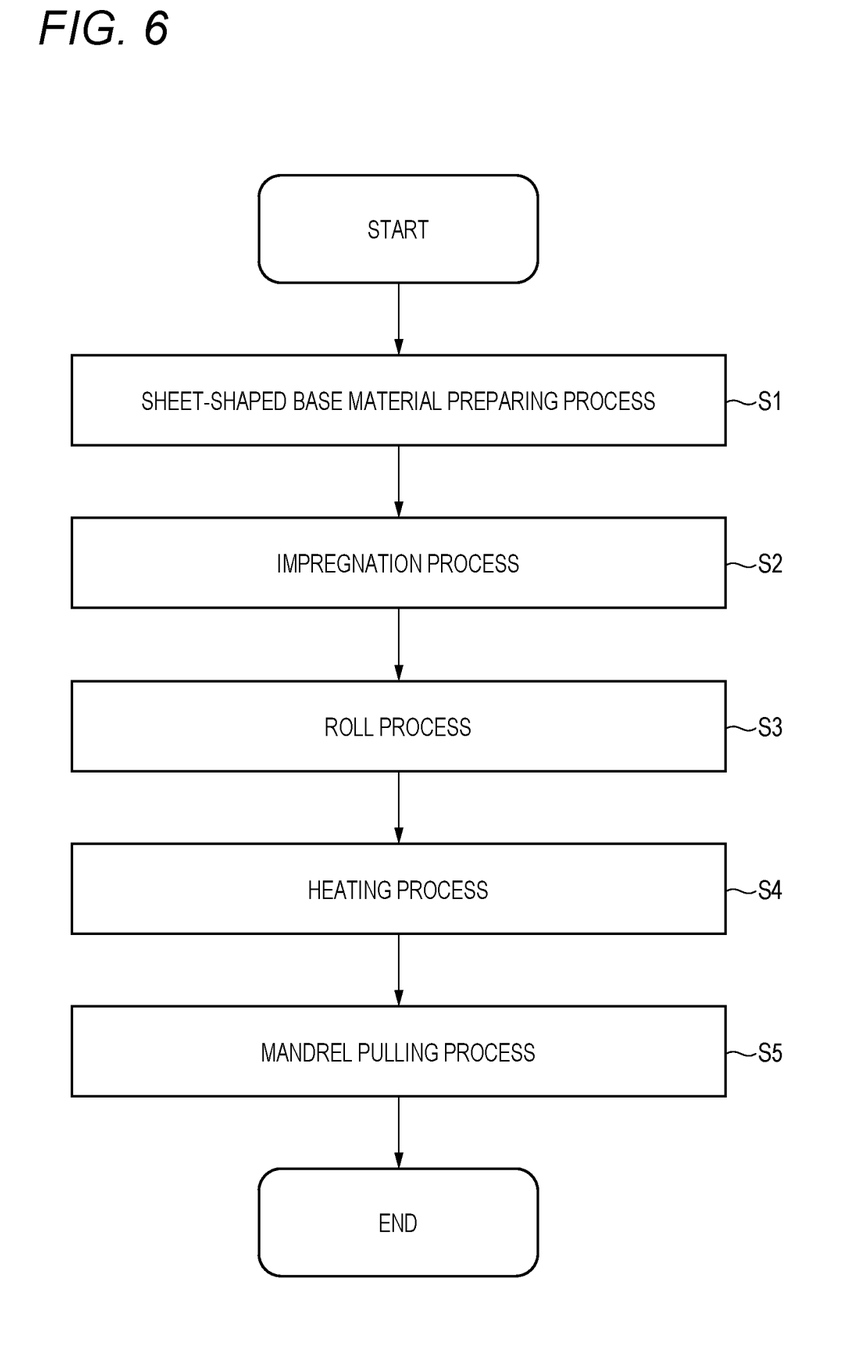
FIG. 6 is a flowchart showing a method of manufacturing the tube of the first embodiment.

Next, an example of a method of manufacturing the tube according to the embodiment will be described with reference to FIG. 6. Hereinafter, as a preferred embodiment, a method of manufacturing a tube in which both the first layer and the second layer include a porous base material will be mainly described.

(Sheet-Shaped Base Material Preparing Process: S1)

First, the sheet-shaped base material is prepared. In this process, if the resin constituting the base material is a thermoplastic resin, a fibrous material may be manufactured in advance by melt extrusion or the like, and the fibrous material may be formed into a woven fabric by using various looms. When manufacturing fibers, stretching may be performed for the purpose of improving mechanical properties, a so-called modified cross-section yarn which is not circular may be used for improving interface interaction with the thermosetting resin to be described later, and, further, a composite yarn using two or more different materials may be used. The manufacturing of the woven fabric can be performed by using either a shuttleless loom or a shuttle loom, and examples of the shuttleless loom include a gripper loom, a rapier loom, a water jet loom, and an air jet loom. An element wire having a yarn diameter of 1 µm to 1000 µm is formed into the woven fabric by various weaving methods with openings of 1 µm to 5000 µm, thereby obtaining a sheet-shaped material.

In addition, when the sheet-shaped base material is a nonwoven-fabric-shaped material, the sheet-shaped base material can be obtained by forming a sheet of randomly dispersed fibers. Specifically, an air-laid method or an electrospinning method can be used in addition to a dry method such as a dry method, a melt-blown method, or a spunbond method. Among such methods, the electrospinning method is useful as a method capable of being applied to PTFE to be described later and forming fine pores.

PTFE and a part of fluorine resins do not substantially exhibit features as thermoplastic resins, and thus it is difficult to obtain a molded article by melt extrusion. In this case, a lubricative solvent (solvent naphtha in the present embodiment) is mixed with PTFE powder, a preformed product is prepared from the mixture, the preformed product is subjected to paste extrusion to form a sheet, the lubricative solvent is dried and removed in a heated oven, and then stretching treatment is performed and thus the sheet-shaped base material having micropores can be prepared. By heating the obtained sheet-shaped base material at a temperature equal to or lower than a melting point of PTFE, it is possible to obtain the sheet-shaped base material whose dimension does not change even at a high temperature.

In the above-described stretching treatment, the stretching treatment is performed in either or both of a direction in which the extrusion is performed by the paste extrusion described above and a width direction of the sheet perpendicular to the extrusion direction. A ribbon is obtained by performing the stretching treatment only in one direction and perform slitting in parallel to the one direction, and a PTFE woven fabric having excellent mechanical properties can be obtained by, for example, performing yarn twisting treatment on the ribbon and then forming a woven fabric.

A porous structure of the stretched porous sheet subjected to the above-described stretching treatment is defined by a porosity and a pore size. In the present invention, the porosity is preferably 50% or more and 95% or less. More preferably, the porosity is 60% or more and 90% or less. A most preferable range is 65% or more and 85% or less. This is because pores are impregnated with a viscous thermosetting resin component before crosslinking, and when the porosity is 50% or less, the impregnation takes time and impregnation unevenness is caused. In addition, when the porosity is 95% or more, deformation easily occurs during shape retention at the time of processing, and it thus becomes difficult to maintain industrial quality. The porosity described above is calculated from density.

The pore size is measured by a pore diameter distribution measuring device perm porometer (POLROLUX 1000 manufactured by IB-FT GmbH). As a measurement solution, GALPORE125 is used. In the measurement by the perm porometer, air pressure is applied to a punched sample ($\varphi 25$ mm, measurement area is about $\varphi 16$ mm$^2$) immersed in the measurement solution, an air flow rate in a wet state and an air flow rate in a dry state are measured, and an average pore diameter is confirmed. Although the measurement of the pore size of the stretched porous sheet has been described above, a pore size of another sheet-shaped base material, that is, a sheet-shaped base material formed in a mesh shape, a nonwoven fabric shape, or a woven fabric shape can also be measured by the measurement method described above.

In this way, the sheet-shaped porous base material having micropores is prepared.

(Impregnation Process: S2)

Next, a resin layer is formed on a surface of the prepared base material. The resin layer is formed between base materials in a state in which the base materials can be held, for example, like the first resin layer IMR1 or the second resin layer IMR2 in FIG. 4 when the tube is formed. The resin layer is preferably a thermosetting resin, and in the case of the porous base material, the thermosetting resin can be made to enter the micropores of the porous base material at the same time as a thermosetting resin layer is formed on the surface. In this process, it is important to obtain a resin layer forming base material having high micropore filling properties and a uniform thickness. As a method for manufacturing the impregnated base material obtained in this process, the thermosetting resin before curing is fluidly applied to the base material in a fluidable state, and the base material is passed through a constant gap such as two rolls, and thus the thermosetting resin can be sufficiently pushed into the pores and the thickness can become uniform. Alternatively, the thermosetting resin may be formed into a sheet shape in advance, and the thermosetting resin and the sheet-shaped base material may be combined and pressed. In addition, when the thermosetting resin has a viscosity of about 100 Pa·s or less, the thermosetting resin can be applied to the sheet-shaped base material by using an ordinary coating machine. Examples of a coating method include curtain coating, spray coating, roll coating, dip coating, blade coating, and bar coating. Blade coating or bar coating is a preferable embodiment for completely filling up the pores of the sheet-shaped base material.

When preparing a resin layer forming base material for forming the first layer and a resin layer forming base material for forming the second layer, a single base material may be switched to different thermosetting resins in the middle of the impregnation process, or different thermosetting resins may be contained in one or two types of base materials.

In addition, in the resin layer forming base material, a thickness of the thermosetting resin may be thicker than that of the base material and a part thereof may be present as a thermosetting resin alone in the radial direction, and a case where only the base material is present alone in the radial direction should be avoided since sufficient bonding cannot be secured in a subsequent roll process. In a laminate such as the tube according to the present invention, a thickness of the resin layer forming base material is preferably 10 µm to 2 mm, more preferably 25 µm to 1 mm, and even more preferably 50 µm to 0.5 mm, depending on a manufacturing method thereof from the viewpoint of workability. In addition, the thickness of the above-described thermosetting resin that is present alone is preferably 50% or less, and more preferably 40% or less of a layer thickness.

In this way, the sheet-shaped base material having the resin layer formed in the micropores and on the surface of the base material can be obtained.

(Roll Process: S3)

Next, the resin layer forming base material subjected to the impregnation process is wound around a mandrel (core rod) having a cross-sectional shape corresponding to a shape of the flow path. For example, the core rod may be fed out while the impregnated sheet-shaped member is continuously wound obliquely in a traveling direction of the core rod, thereby enabling continuous production.

Alternatively, the core rod may be wound without moving in a longitudinal direction. In this winding method, a winding direction of the base material is defined in a plane perpendicular to an extending direction of the core rod. In this winding method, a maximum tube length that can be prepared is limited by a length of the core rod and a width of the base material, and a winding structure in which variations in diameter and characteristics are controlled to be small can be obtained. The formation of the first layer and the second layer of the body portion of the tube can be implemented by preparing two types of resin layer forming base materials having different base materials and/or different impregnated resins in advance, winding and laminating the resin layer forming base material to be the first layer, and then winding and laminating the resin layer forming base material to be the second layer thereon.

(Heating Process: S4)

Next, the resin layer forming base material laminated on the mandrel in the roll process is cured. For example, the curing can be performed by placing and heating in a mold that defines an outer shape of the tube. The heating is performed to complete the crosslinking reaction of the thermosetting resin.

(Mandrel Pulling Process: S5)

Thereafter, the mandrel is pulled out from the tube. Through the above processes, the tube is completed.

(Measurement Method)

The flexural modulus of elasticity in the radial direction can be measured using a measurement sample obtained by cutting out a part of the tube. For preparation of the measurement sample, a strip-shaped test piece may be cut out regardless of a curvature of the tube, or the test piece may be cut out along the circumferential direction. For example, in the case of a laminate, a notch is formed, and a part of layers are separated with the notch serving as a starting point, so that a sample cut out along the circumferential direction can be easily prepared.

For example, a flexural modulus of elasticity of the cut sample can be obtained by a method specified in Japanese Industrial Standards, JIS K 7106, a cantilever bending stiffness test method for plastics.

Depending on a tube diameter and an elastic modulus of a material, it may be difficult to perform highly reproducible measurement by the method specified in the above-described Japanese Industrial Standards. In such a case, for example, after obtaining a characteristic value corresponding to an elastic modulus in the following form, the value can be used as the flexural modulus of elasticity directly or after performing a necessary calculation.

In this case, it is important to match a comparison target with a measurement method or a calculation method. For example, when the purpose is to compare magnitudes of the flexural moduli of the first layer and the second layer, it should be noted that a relative relationship of values of the flexural moduli is not reversed due to a difference in measurement methods.

In addition, it is desirable to make shapes of measurement samples as uniform as possible.

Hereinafter, an example of a measurement method will be described in which a difference in elastic modulus can be clarified and reproducibility is secured even in the case of a minute sample or a sample having a small elastic modulus, which is difficult to measure with high reproducibility by Japanese Industrial Standards and the like described above.

First, a sheet-shaped sample having a uniform thickness (size in the radial direction) along the circumferential direction of the tube is cut out by a method such as severing, peeling, or cutting from the tube. A thickness of the sheet-shaped sample is preferably in a range of 0.3 mm or more and 1 mm or less.

Next, a test piece is cut out from the sheet-shaped sample so as to have a rectangular shape in a plan view. It is preferable that a long side of the rectangle is cut out so as to be parallel to the longitudinal direction of the tube, that is, the first direction, and a length of the long side is 10 mm or more. A short side of the rectangle is, for example, 5 mm or more and 15 mm or less, and it is important that a remaining curvature of the test piece does not become excessively large relatively. Adjustment may be performed appropriately according to a diameter of the original tube as necessary. For example, a spread length (a length along the short side) of the short side of the test piece is set to a range not exceeding 50% of an original circumferential length (a length in the circumferential direction in a tube state) at most. Thus, when the test piece is assumed to have a sector shape when viewed from the first direction, a vertex angle thereof does not exceeds 180 degrees.

A compression tester used for measurement includes a fixed stage and a moving stage having parallel surfaces facing each other. The moving stage is movable relative to the fixed stage, and at least one of the stages includes a load cell and can measure a minute change in stress applied to the stage.

After the test piece in a state of being lightly bi-folded along a perpendicular bisector of the short side is disposed between the stages of the compression tester, the movable stage is moved at a speed of about 5 mm/min in a direction approaching the fixed stage, and a gap between the stages is adjusted to be twice the thickness of the test piece. This state is close to the tube shape when completely crushed by a roller of a peristaltic pump, and the test piece is bi-folded until the test piece becomes flat. Since long-time holding in this state may cause an irreversible shape change, it is preferable to start a subsequent operation of expanding the gap between the stages within 3 seconds.

In the gap expansion operation, the movable stage is moved at a speed of about 5 mm/min in a direction away from the fixed stage. With this expansion, the test piece is deformed in a direction approaching an original shape thereof. The gap between the stages after the expansion is, for example, four times the thickness of the test piece. However, when a curvature of the test piece is large or the like, a state in which the long sides are abutted against each other in this gap may be maintained. In such a case, a distance at which the long sides including a comparison target are reliably separated from each other is determined, and the distance is set as a gap after expansion. However, if the distance is excessively large, a measurement value decreases, and accurate measurement by the test piece becomes difficult, and thus it is preferable to apply a minimized value as the set value within the distance that can be reliably separated.

After the expansion to the predetermined gap, a load cell indicated value after a lapse of one minute is acquired. The reason for waiting for one minute is to reduce a repulsive force of the tube. An elastic modulus can be obtained by dividing the obtained indicated value by a cross-sectional area of the test piece, that is, a product of the thickness and the length of the long side of the test piece. The measurement is preferably performed in a temperature-controlled environment, preferably in an environment of 23° C.±2° C.

In the test, a plurality of the test pieces may be cut out from different positions in the same layer, and an average value thereof may be compared. The number of n per level is preferably 6 or more, and may also be further increased to such an extent that a relative magnitude relationship can be clarified as necessary. Effectiveness of obtaining and comparing the elastic modulus based on the average value of the plurality of test pieces is the same for the following measurement.

In a case where the test piece has a curvature even in a no-load state, it is preferable that a direction in which an operation of the peristaltic pump is reproduced, that is, a mountain side at the time of bi-folding is an outer circumferential side of the curvature. When determination is made by comparing average values using a plurality of acquired values, it is also possible to bend a part of the test pieces in a direction opposite to the direction described above and perform the measurement. In this way, it is possible to alleviate an influence on measurement results due to inherent curvatures of the test pieces.

When desired comparison accuracy of the flexural modulus of elasticity in the circumferential direction cannot be obtained even in the above-described method due to a size of the sample or a range of the elastic modulus, a comparison using another measurement method is also proposed. For example, in both levels to be compared, if extending directions of all base material in a layer are in the circumferential direction, a comparison result of a compression modulus of elasticity in a direction perpendicular to an extending direction of the base materials, that is, in the radial direction may be applied. This is because, under a condition where the elastic modulus of the resin layer between the base materials is strongly reflected, a relative relationship of compression elasticity coincides with a relative relationship of flexural elasticity.

Similarly, in both levels to be compared, when the base materials in the layer extend in the circumferential direction and in the first direction in each layer, a comparison using a flexural modulus of elasticity in the first direction is also proposed. The flexural modulus of elasticity in the first direction can be obtained by bending the test piece in a direction in which sides parallel to the circumferential direction are abutted against each other. However, when the test piece has a curved shape similar to the tube shape, the elastic modulus is obtained by bending the test piece in a direction orthogonal to the curved shape of the test piece, and thus care should be taken such that a change in elastic modulus due to a shape effect of the test piece does not become dominant. An influence of the shape effect can be reduced by comparing samples having similar original curved shapes, reducing lengths of the sides parallel to the circumferential direction, and the like.

A tensile modulus of elasticity in the circumferential direction can be measured using a test piece cut out from the tube according to the present invention in accordance with ASTM D412 (JIS K 6251, ISO 37) except for the shape of the test piece. The test piece can be obtained by the same method as the above-described test piece for measuring the flexural modulus of elasticity, and in the case of a multilayer structure in which a plurality of layers of base materials are laminated in the same layer, it is preferable to prepare a sheet-shaped sample in such a manner that five or more layers of the base material layer are included. A thickness (a size in the radial direction) of the test piece may be 0.3 mm to 1 mm, a size of a long side may be 20 mm or more, and a size of a short side may be 5 mm or more. Here, the test piece is cut out in such a manner that the long side of the test piece is in the circumferential direction of the tube.

The test piece is chucked in a tensile tester set to have a chuck-to-chuck distance of 10 mm such that the test piece is not bent as much as possible, and then a load in a predetermined strain state is acquired. The elastic modulus is obtained by dividing the obtained load by a cross-sectional area of the test piece. For comparison, it is preferable to apply an elastic modulus having a strain of 40% to 60% among obtained elastic moduli.

A compression modulus of elasticity in the radial direction can be measured as follows. A test piece is prepared by cutting out a part of the tube in the same manner as described above. The strip-shaped test piece may be cut out regardless of the curvature of the tube, or the test piece may be cut out along the circumferential direction. Alternatively, it is also possible to prepare by separating a part of layers with a notch serving as a starting point.

In order to implement measurement with high reproducibility, a thickness (a size in the radial direction) of the test piece is preferably 1 mm or more, depending on sensitivity of a measurement device and an elastic modulus of a measurement target. Shape and size of the test piece when viewed from the radial direction are not limited, and a rectangular shape in which a length of one side is secured to be twice or more the thickness is exemplified. For example, the length of one side of the test piece can be set to about 10 mm. In a case where the test piece has a curve derived from the tube shape, when the test piece is placed on a measurement stage, a part of the test piece may float, and reproducibility may decrease, and thus it is preferable that a length of the test piece in the circumferential direction is not longer than necessary.

In the measurement, when a separation region is generated in a part of a compression region of a probe of the compression tester due to probe floating (or test piece floating) caused by the curve of the test piece, the probe is selected to minimize an area of the separation region, and a direction in which the test piece is placed and the like are adjusted. In addition, even when the separation region remains, it is preferable to adjust a separation distance to such an extent that the separation distance does not exceed 10% of the thickness of the test piece.

In the compression test, the elastic modulus can still be obtained by obtaining a load in a predetermined strain state and dividing this value by an area of a compression region.

The compression modulus of elasticity can be easily obtained by using a rubber hardness meter. First, a test piece is prepared in the same manner as described above. A thickness of the test piece is preferably 1 mm or more. The test piece may have a rectangular shape having a side of 9 mm or more when viewed from the radial direction. As a durometer, an M type or an AM type may be used. The elastic modulus may be calculated based on acquired durometer hardness.

EXAMPLES

First Example

As the base material constituting the first base material layer of the first layer and the base material constituting the second base material layer of the second layer, a thin-film-shaped sheet made of polytetrafluoroethylene (PTFE) was applied.

The thin-film-shaped sheet of PTFE was produced by the following procedure, for example, based on techniques already disclosed in Japanese Examined Patent Application Publication No. 56-045773, Japanese Examined Patent Application Publication No. 58-18991, Japanese Examined Patent Application Publication No. 56-45773, and the like, which are documents of related art, as techniques in the related art. First, in a polyethylene container, 19 parts by mass of an auxiliary agent (Isopar H manufactured by Exxon Mobil Corporation) was put and mixed into 100 parts by mass of PTFE fine powder (POLYFLON PTFE F-106 manufactured by Daikin Industries, Ltd.), and the mixture was put into a preliminary molding machine to produce a preliminary molded article. Next, the preliminary molded article is put into an extrusion molding machine and extruded by a cylinder extruder so as to be molded into a tape shape. The tape is rolled to a desired thickness by using a metal roll, and then the tape is heated so as to sufficiently dry Isopar H. The dried tape is stretched to 5 times an original length in a direction perpendicular to a longitudinal direction in a state of being heated to 280° C., and then the obtained stretched PTFE is subjected to heat treatment at 350° C. to obtain a uniaxially stretched PTFE tape having a porosity of 78%, an average pore diameter of 0.83 μm, and a film thickness of 50 μm.

Two types of resin layer forming base materials are prepared by applying a perfluoropolyether elastomer (Shin-Etsu Chemical Co., Ltd., grade: SIFEL3590-N) as the first resin constituting the first resin layer of the first layer, and applying a thermosetting silicone elastomer (Shin-Etsu Chemical Co., Ltd., grade: KE-1884) having a lower elastic modulus than the perfluoropolyether elastomer as the second resin constituting the second resin layer of the second layer formed outside the first layer.

First, the resin layer forming base material using the first resin is wound around a mandrel. At this time, the number of laminated layers is 12. Next, the resin layer forming base material of the second resin is wound on the wound resin layer forming base material of the first resin. At this time, the number of laminated layers is also 12.

The mandrel wound up to the resin layer forming base material of the second resin is subjected to heat treatment to cure both the first resin and the second resin. Next, the mandrel is pulled out to obtain a tube in which the first layer containing the first resin and the second layer containing the second resin are formed in this order on the flow path. The tube has a tube inner diameter of 6.4 mm, a tube total thickness of 2.4 mm, and a tube outer diameter of 11.2 mm.

In this tube, due to a difference in elastic moduli between the first resin (above-described perfluoropolyether elastomer) and the second resin (above-described thermosetting silicone elastomer), the flexural modulus of elasticity in the radial direction of the second layer including the second resin is smaller than the flexural modulus of elasticity in the radial direction of the first layer including the first resin. Meanwhile, since the base materials effectively act on the tensile modulus of elasticity in the circumferential direction, an influence of physical property values of the resins does not cause a large change as much as the flexural modulus of elasticity. As a result, the elastic modulus ratio R represented by the tensile modulus of elasticity in the circumferential direction/the flexural modulus of elasticity in the radial direction is larger in the second layer than in the first layer.

In addition, due to extending directions of the base materials, the second layer has anisotropy of the elastic modulus. Specifically, the tensile modulus of elasticity in the circumferential direction of the second layer is larger than the flexural modulus of elasticity in the radial direction of the second layer. Alternatively, the tensile modulus of elasticity in the circumferential direction of the second layer is larger than the tensile modulus of elasticity in the radial direction of the second layer.

The tube is subjected to a durability test using a peristaltic pump. In the durability test, a 520 type peristaltic pump manufactured by Watson Marlow Co., Ltd. (head used: 520 REM) that performs pumping at a speed of 160 rpm is used. Water at 25° C. is used as the fluid to be transported in the test.

When the number of rollers until a flow rate reached 90% or less is measured, a very long service life of 2,500,000 times is confirmed.

The tube having such a configuration has the second layer that is easily bent, and also prevents the above-described problems, that is, insufficient closing caused by the second layer being stretched and thinned, a decrease in flow rate caused by the insufficient closing, and the like.

COMPARATIVE EXAMPLE

A comparative example is different from the first example in that the resin forming base material forming the first resin of the first example described above is applied to the second layer, and the resin forming base material forming the second resin is applied to the first layer, and the other configurations are the same.

In a tube of the present comparative example, the flexural modulus of elasticity in the radial direction of the second layer formed on the first layer is larger than the flexural modulus of elasticity in the radial direction of the first layer formed on the flow path.

When the tube is subjected to the durability test using the peristaltic pump under the same conditions as described above, the flow rate decreases to 90% or less after 50,000 times.

REFERENCE SIGNS LIST 20 tube, BD body portion, BL1 first layer, BL2 second layer, CH flow path, CG center, 20a inner circumferential surface, 20b outer circumferential surface, CB case portion, HD head portion, PMB1 first base material layer, IMR1 first resin layer

The invention claimed is:

1. A tube for use in a pump that transports a fluid by peristaltic movement, the tube comprising:
a flow path that serves as a transport path of the fluid and extends in a first direction; and
a body portion formed around the flow path, wherein
the body portion includes a first layer formed on the flow path and a second layer formed on the first layer,
a flexural modulus of elasticity in a radial direction of the second layer is smaller than a flexural modulus of elasticity in a radial direction of the first layer, and
when an elastic modulus ratio R1 of the first layer is defined as a ratio of a tensile modulus of elasticity in a circumferential direction of the first layer to the flexural modulus of elasticity in the radial direction of the first layer, and
an elastic modulus ratio R2 of the second layer is defined as a ratio of a tensile modulus of elasticity in a circumferential direction of the second layer to the flexural modulus of elasticity in the radial direction of the second layer,
the elastic modulus ratio R2 of the second layer is larger than the elastic modulus ratio R1 of the first layer.

2. The tube according to claim 1, wherein
the first layer includes a first porous base material having a plurality of micropores and a first resin entering the plurality of micropores of the first porous base material, and
the second layer includes a second porous base material having a plurality of micropores and a second resin entering the plurality of micropores of the second porous base material.

3. The tube according to claim 2, wherein
the first layer includes a laminated structure formed of a plurality of the first porous base materials and a first resin layer formed between the plurality of first porous base materials, and
the second layer includes a laminated structure formed of a plurality of the second porous base materials and a second resin layer formed between the plurality of second porous base materials.

4. The tube according to claim 3, wherein the plurality of porous base materials of the second layer extend in a circumferential direction of the tube in a cross section perpendicular to the first direction.

5. A peristaltic pump comprising: the tube according to claim 1; and a head portion and a case portion being capable of closing an internal space of the tube by crushing the tube.

6. A tube for use in a pump that transports a fluid by peristaltic movement, the tube comprising:

a flow path that serves as a transport path of the fluid and extends in a first direction; and a body portion formed around the flow path, wherein the body portion includes a first layer formed on the flow path and a second layer formed on the first layer, a flexural modulus of elasticity in a radial direction of the second layer is smaller than a flexural modulus of elasticity in a radial direction of the first layer, and a tensile modulus of elasticity in a circumferential direction of the second layer is larger than the flexural modulus of elasticity in the radial direction of the second layer and/or a tensile modulus of elasticity in the radial direction of the second layer.

7. The tube according to claim 6, wherein the first layer includes a first porous base material having a plurality of micropores and a first resin entering the plurality of micropores of the first porous base material, and the second layer includes a second porous base material having a plurality of micropores and a second resin entering the plurality of micropores of the second porous base material.

8. The tube according to claim 7, wherein the first layer includes a laminated structure formed of a plurality of the first porous base materials and a first resin layer formed between the plurality of first porous base materials, and the second layer includes a laminated structure formed of a plurality of the second porous base materials and a second resin layer formed between the plurality of second porous base materials.

9. The tube according to claim 8, wherein the plurality of porous base materials of the second layer extend in a circumferential direction of the tube in a cross section perpendicular to the first direction.

10. A peristaltic pump comprising: the tube according to claim 6; and a head portion and a case portion being capable of closing an internal space of the tube by crushing the tube.

11. A tube for use in a pump that transports a fluid by peristaltic movement, the tube comprising:

a flow path that serves as a transport path of the fluid and extends in a first direction; and a body portion formed around the flow path, wherein the body portion includes: a first layer that is formed on the flow path and includes a first porous base material having a plurality of micropores and a first resin entering the plurality of micropores of the first porous base material; and a second layer that is formed on the first layer and includes a second porous base material having a plurality of micropores and a second resin entering the plurality of micropores of the second porous base material, a flexural modulus of elasticity in a radial direction of the second layer is smaller than a flexural modulus of elasticity in a radial direction of the first layer, and the second porous base material extends in a circumferential direction of the tube in a cross section perpendicular to the first direction.

12. The tube according to claim 11, wherein a region formed of the second porous base material and the second resin is larger in a radial direction than a region formed of the first porous base material and the first resin.

13. The tube according to claim 11, wherein an average inter-base-material distance in a region formed of the second porous base material and the second resin is larger than an average inter-base-material distance in a region formed of the first porous base material and the first resin.

14. A peristaltic pump comprising: the tube according to claim 11; and a head portion and a case portion being capable of closing an internal space of the tube by crushing the tube.

* * * * *